(12) United States Patent
Tanimoto et al.

(10) Patent No.: US 6,568,858 B2
(45) Date of Patent: *May 27, 2003

(54) BALL BEARING

(75) Inventors: Kiyoshi Tanimoto, Osaka (JP); Shinji Abe, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/919,934

(22) Filed: Aug. 2, 2001

(65) Prior Publication Data

US 2002/0001423 A1 Jan. 3, 2002

Related U.S. Application Data

(63) Continuation-in-part of application No. 09/122,898, filed on Jul. 28, 1998, now Pat. No. 6,280,537.

(30) Foreign Application Priority Data

Aug. 1, 1997 (JP) ............................................. 9-207684

(51) Int. Cl.⁷ ............................................. F16C 33/32
(52) U.S. Cl. ...................................... 384/492; 384/609
(58) Field of Search ............................... 384/492, 609, 384/613, 912, 907.1; 148/320, 906

(56) References Cited

U.S. PATENT DOCUMENTS

| 4,799,810 A | * | 1/1989 | Gilbert | 384/606 |
| 4,963,040 A | * | 10/1990 | Takebayashi et al. | 384/492 |
| 5,163,757 A | * | 11/1992 | Graham | 384/463 |
| 5,228,786 A | * | 7/1993 | Tanimoto et al. | 384/492 |
| 5,413,643 A | | 5/1995 | Murakami et al. | |
| 5,485,331 A | | 1/1996 | Dunfield et al. | |
| 5,639,168 A | * | 6/1997 | Noguchi et al. | 384/492 |
| 6,280,537 B1 | * | 8/2001 | Tanimoto et al. | 148/320 |

OTHER PUBLICATIONS

Patent Abstract of Japan—No. 06330761 A dated Nov. 29, 1994.
Patent Abstract of Japan—No. 07139550 A dated May 30, 1995.
Patent Abstract of Japan—No. 08312651 A dated Nov. 26, 1996.
Patent Abstracts of Japan, Publication No. 08312651 A, Nov. 26, 1996.

* cited by examiner

*Primary Examiner*—Matthew C. Graham
*Assistant Examiner*—Mariano Sy
(74) *Attorney, Agent, or Firm*—Jacobson Holman PLLC

(57) ABSTRACT

A rolling bearing composed of a combination of bearing wings formed with a steel material and rolling elements formed with a ceramic material, wherein the residual austenite amount of the steel material forming the rolling rings is controlled to a specific value. By the construction, at rolling of the rolling elements formed with a relatively hard ceramic material, the occurrence of the surface scratches of the rolling elements can be restrained, which results in restraining the vibrations and noises caused by the rolling bearing.

18 Claims, 3 Drawing Sheets

F I G. 3
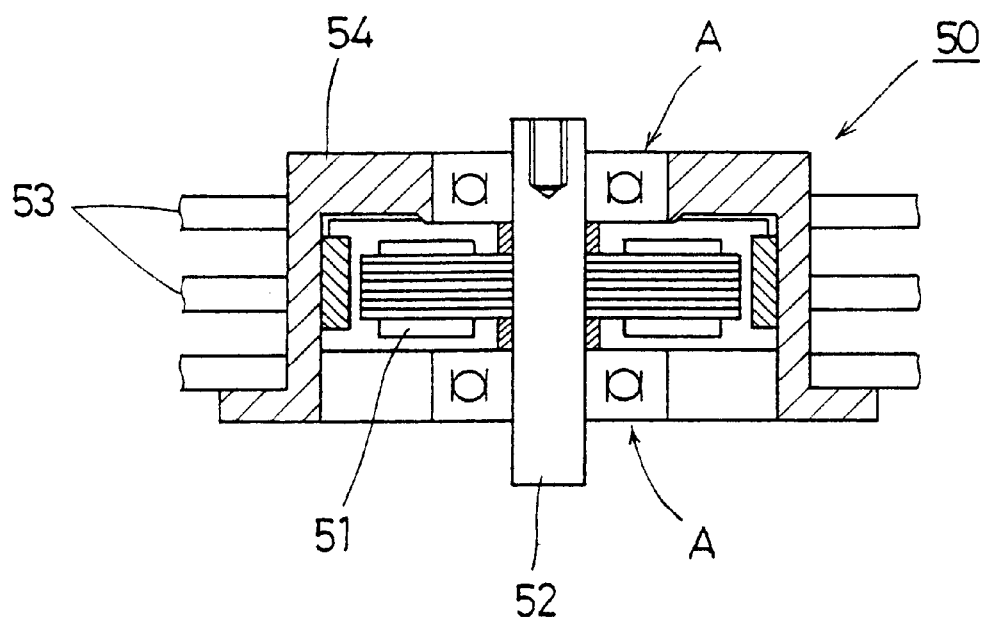

BALL BEARING

CROSS-REFERENCE TO RELATED APPLICATION

This application is a Continuation-in-Part of earlier U.S. patent application Ser. No. 09/122,898 filed on Jul. 28, 1998, now U.S. Pat. No. 6,280,537.

BACKGROUND OF THE INVENTION

The present invention relates to roller bearings, and more particularly to a roller bearing suitably used, for example, for information instruments such as hard disc devices (HDDs), video tape recorders (VTRs), laser printers and the like.

Previously, roller bearings for supporting a spindle motor of hard disc devices and the like have employed a bearing ring and rolling element both of which are formed of steel.

In the above-described hard disc devices, to prevent the occurrence of writing errors and reading errors, the improvement of the acoustic characteristics such as vibrations, noises, etc., has been required.

Also, because these information instruments are frequently placed near users at a relatively calm place in an office, a home, etc., it is strongly desired to reduce the generation of noises, particularly, having the frequency in the audible range of a human.

Under such circumstances, to quiet a rolling bearing for supporting a spindle motor, it has been conventional practice to reduce the shape errors of each bearing component as much as possible, for example, by maximizing the roundness of inner and outer rings and by equalizing the sizes of all rolling elements.

In addition, when the constituting elements of a rolling bearing are formed of ball bearing steel, a heat treatment such as hardening, tempering, etc., is applied to the ball and ring elements which results in the residual austenite in the rolling element and ring being approximately 10%.

When such conventional roller bearings are subjected to inadequate lubrication, overheating results so as to cause defects such as fine impressions, cracks and peelings to form on the roller elements and the bearing rings, with such defects resulting in undesirable noise and vibration.

Also, as the result of investigations, it has been confirmed that one of the causes of noises generated by a rolling bearing is the fine scratches formed on, in particular, rolling elements. On the other hand, recently developed roller elements formed of hard ceramic material are resistant to being scratched. When the rolling element is formed with a ceramic material, the generation of noises by scratches is reduced because the ceramic material of the roller differs from the steel material of the bearing ring; also, sticking of the ball and ring component by coagulation because of inadequate or inferior lubricant can be reduced.

As described above, the formation of rolling elements with a ceramic material is effective for improving the acoustic characteristics of a ball bearing. However, the inventor's further investigations revealed that use of ceramic rollers creates a further problem needing to be solved.

That is, when a rolling element is formed of ceramic, because the hardness and rigidity of the rolling element is increased and the rolling element is hard to deform, the contact area of the rolling element and the bearing ring becomes small and the stress applied to the orbital surface becomes large. Accordingly, when the bearing ring is formed of conventional steel wherein the residual austenite amount is about 10%, the contact portion with the rolling bearing element is liable to cause permanent ring deformation and resultant generation of unacceptable vibrations and noises. Also, when stress applied to the orbital surface becomes large, there is a problem that austenite is liable to cause a martensite transformation. Furthermore, in the case of using a ball bearing steel wherein the residual austenite amount is about 10%, there is a problem that the amount of the generated heat by the martensite transformation increases heat generation and undesirable excessive bearing temperature.

SUMMARY OF THE INVENTION

Accordingly, an object of the present invention is to provide a rolling bearing providing a reduction in undesirable characteristics such as vibrations, noises and the like.

Another object of the present invention is to provide a rolling bearing capable of stable and continuous excellent performance for a long period of time even under operating conditions of severe lubricant deficiency.

Still other objects, the features, and the merits of the present invention will become clear from the following descriptions.

That is, a first aspect of the present invention is a rolling bearing comprising a bearing ring formed with a steel material and a rolling element formed with a ceramic material, wherein the residual austenite amount of the steel material forming the bearing ring is not more than 8%.

Furthermore, a second aspect of the present invention in a preferred embodiment is a rolling bearing of the first aspect wherein the residual austenite amount of the steel material forming the bearing ring is from 0.05% to 6%.

In addition, if the residual austenite amount ($Y_R$) is less than 0.05%, there is an increased tendency for the formation of cracks so as to decrease the life expectancy of the bearing. On the other band, if the residual austenite amount exceeds 8%, the hardness is decreased so as to permit increased permanent deformation of the rolling bearing surface by either static loads or impact loads causing unacceptable scratches and impressions in the rolling bearing surface. The critical value of the residual austenite ($Y_R$) is consequently specified as described above.

BRIEF DESCRIPTION OF THE DRAWINGS

These and other objects as well as advantages of the present invention will become clear by the following description of preferred embodiments of the present invention with reference to the accompanying drawings, wherein:

FIG. 3 is a cross-sectional view showing an using example of the rolling bearing of FIG. 1.

DETAILED DESCRIPTION OF THE INVENTION

Then, the preferred example of the rolling bearing of the present invention is explained by referring to the accompanying drawings.

Figure 1:
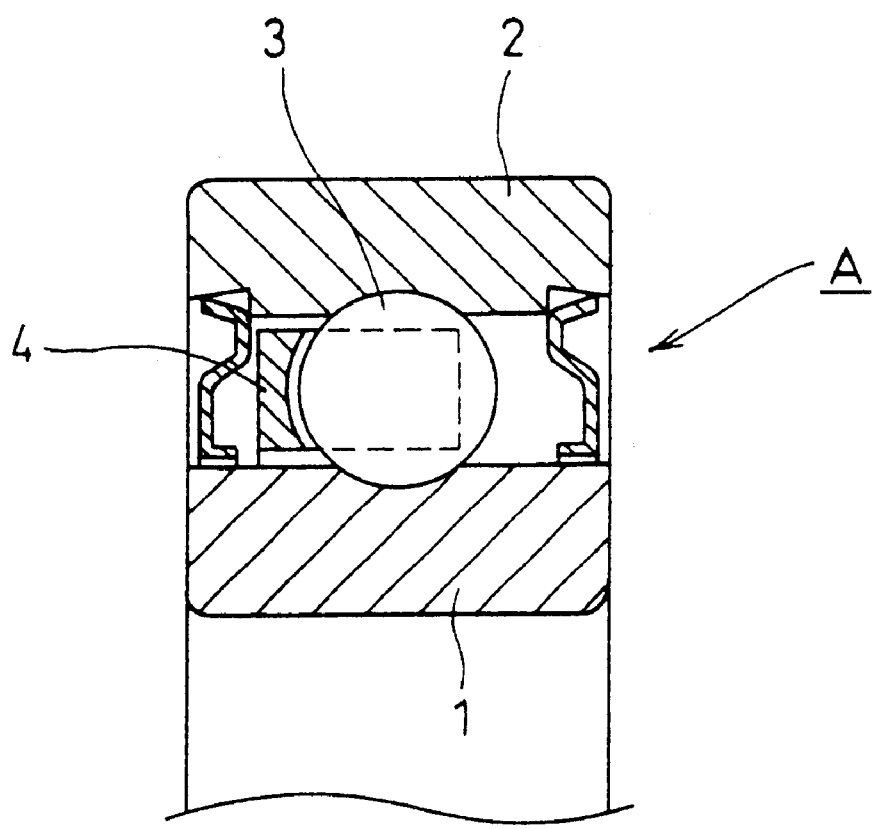
FIG. 1 is a cross-sectional view of the upper half of a preferred embodiment of the rolling bearing of the present invention.
Figure 2:
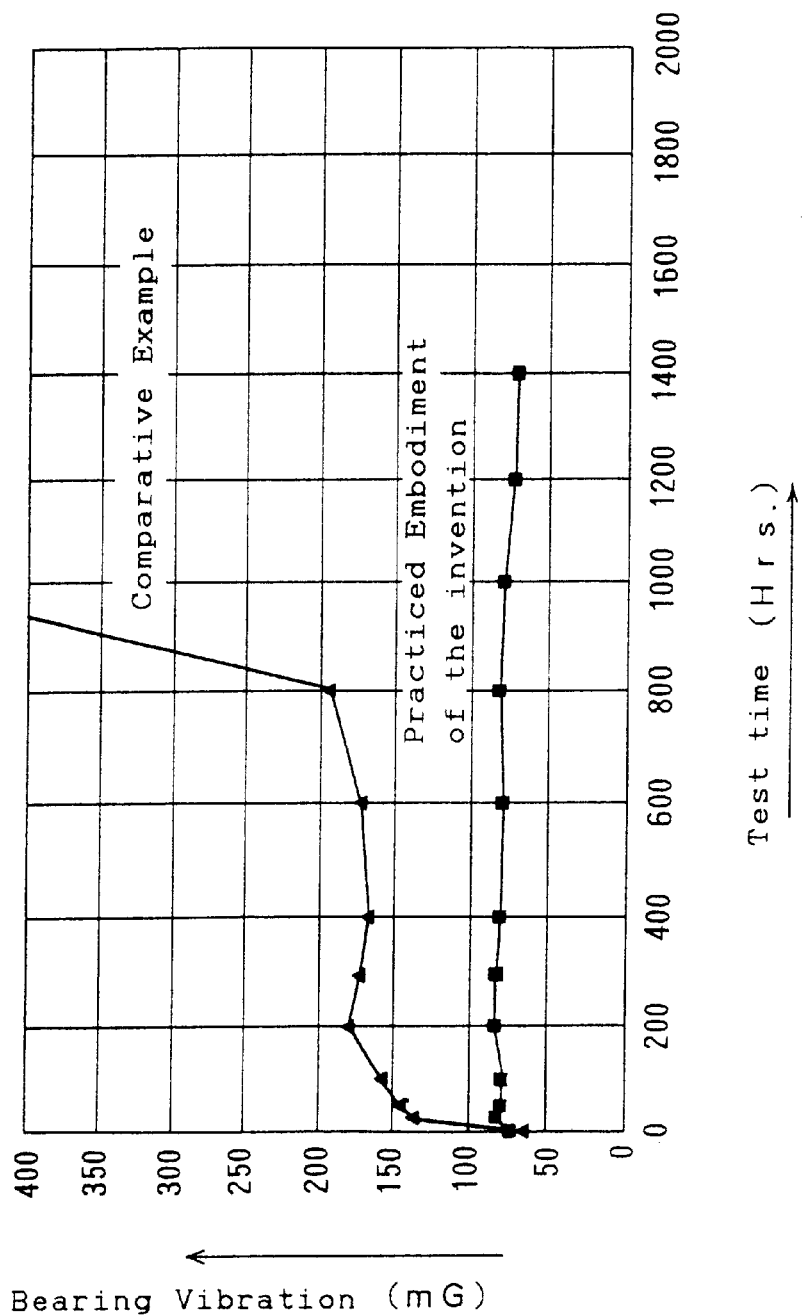
FIG. 2 is a graph showing the change of the vibration of the rolling bearing of FIG. 1 with the passage of time.

First, a preferred example of the rolling bearing of the present invention is explained by referring to FIG. 1 to FIG. 3.

The rolling bearing A according to the preferred example of the present invention is a deep groove ball bearing. The rolling bearing A is constituted by an inner ring 1, an outer ring 2, plural rolling elements 3, and a retainer 4. Also, the inner ring 1 and the outer ring 2 are formed with a metal material, the rolling elements 3 are formed with a ceramic material, and the retainer 4 is formed with a synthetic resin material, etc.

Practically, the inner ring 1 and the outer ring 2 are prepared by, after shaping the forms using a ball bearing steel (JIS Standard SUJ 2), applying a series of heat treatments such as a hardening treatment, a sub-zero treatment, a tempering treatment, whereby the residual austenite amount ($Y_R$) is controlled to become from 0.05 to 6%, and thereafter, by applying thereto a finishing treatment such as polishing, etc. The above-described hardening treatment is the treatment of holding for several tens minutes at 850° C. and thereafter oil-cooling. The sub-zero treatment is the treatment of holding for from several tens minutes to several hours at −70° C. and thereafter air-cooling. And the tempering treatment is the treatment of holding for several tens minutes to several hours at 220° C. and thereafter air-cooling. For example, when in the hardening treatment, after holding for 10 minutes at about 850° C., oil-cooled, in the sub-zero treatment, after holding for 1 hour at −70° C., air-cooled, and in the tempering treatment, after holding for 1 hour at 220° C., air-cooled, the residual austenite amount ($Y_R$) can be controlled to 2%. The region of the residual austenite is a surface portion, for example, is the portion from the surface to a depth of about 10 $\mu$m, and also the surface hardness is established to be from 60 to 64 in HRC. In addition, as the material for the inner ring 1 and the outer ring 2, in addition to the above-described material, JIS standard SUS440 and various ball bearing steels obtained by improving the above-described JIS standard SUJ2 may be used.

The rolling elements 3 can be formed with ceramic material made up of silicon nitride ($Si_3N_4$) as the main body and using yttria ($Y_2O_3$) and alumina ($Al_2O_3$), and further aluminum nitride (AlN), titanium oxide ($TiO_2$), and spinel ($MgAl_2O_4$) as sintering aids, and also can be formed with ceramics using alumina ($Al_2O_3$), silicon carbide (SiC), zirconia ($ZrO_2$), aluminum nitride (AlN), etc.

Practically, it is preferred that the rolling elements 3 are ceramic balls formed with a ceramic made up of from 1.5 to 5.5% weight yttria ($Y_2O_3$), from 1 to 2% by weight aluminum nitride (AlN), from 2 to 4.5% by weight alumina ($Al_2O_3$), from 0.5 to 1.0% by weight titanium oxide ($TiO_2$), and rest being silicon nitride ($Si_3O_4$). Also, when the rolling element 3 is a ball having a diameter of 2 mm, it is preferred that the precision is JIS Standard B1501-G3 or higher, for example, the design shown in following Table 1. It should also be noted that JIS Standard B1501-G3 or higher, is applicable to balls of any diameter including, but not limited to, balls having diameters ranging between 0.8 mm to 2.7781 mm (7/64 inch).

TABLE 1

| CLASS | DIAMETER UNEQUAL LARGEST | SPHERICITY LARGEST | SURFACE ROUGHNESS Ra LARGEST | DIAMETER DIFFERENCE OF ROTS LARGEST |
|---|---|---|---|---|
| 3 | 0.03 | 0.03 | 0.002 | 0.05 |
| 5 | 0.08 | 0.08 | 0.004 | 0.14 |

In the above table, the unit is $\mu$m.

It has been determined that ceramic balls 3 which range in diameter from approximately 0.8 mm to approximately 2.7781 mm and specific diameters include 0.8 mm, 1.2 mm, 1.5875 mm (1/16 inch) and 2.7781 mm (7/64 inch) provide equally desirable results. However, the invention is not limited to the aforementioned diameters since both smaller and larger sizes than those noted should provide equally impressive results. The standards and accuracy reflected by Table 1 are equally applicable to different diameter balls of all diameters including the foregoing recited diameters.

The retainer 4 can be formed with a general polyamide resin (nylon 66) or other thermoplastic resins having a heat resistance, for example, fluorine-based resins such as polytetrafluoroethylene (PTFE), ethylene tetrafluoroethylene (ETFE), etc., and engineering plastics such as polyether ether ketone (PEEK), polyphenylene sulfide (PPS), polyether sulfone (PES), nylon 46, etc. In addition, in the use under a low-temperature circumstance at about room temperature and under a right-load condition, polypropylene (PP) or polyethylene (PE) can be used. Also, as the form of the retainer 4, in addition to the crown form shown in FIG. 1, a wave form, etc., is optionally used.

In the above-described rolling bearing A according to the preferred practical examples of the present invention, the orbital surfaces of the inner ring 1 and the outer ring 2 have a proper hardness and also a proper tenacity and have a stable structure that the residual austenite is hard to cause a martensite transformation. Also, the work scratches on the surface of the rolling element 3 are less than those of a steel-made rolling element and the rolling movement of the rolling elements 3 becomes smooth.

In particular, when the rolling elements 3 are formed with a ceramic, the contact surface pressure becomes large but by constructing the inner ring 1 and the outer ring 2 as described above, fine impressions, cracks, peelings, etc., are hard to form on the inner and outer rings 1 and 2, whereby the occurrence of the surface scratches with the passage of time is restrained.

Moreover, because the material of the inner and outer rings 1 and 2 differs from the material of the rolling elements 3, even in the circumstance of severe lubricant quality or quantity conditions, and of the rolling elements 3 coming into rolling contact with slipping, surface scratches of the inner and outer rings 1 and 2 and the rolling elements 3 resulting from sticking by aggregation as in the conventional case of using the same metallic material for these parts, becomes unlikely to occur. That is, the scratch-resistance effect of the inner and outer rings 1 and 2 and the rolling elements 3 is greatly improved as compared with the conventional cases and also the dimensional changes of the inner and outer rings 1 and 2 are restrained, whereby the rolling movement of the rolling elements 3 can be smoothly maintained.

From the above-described improvements, the acoustic characteristics such as vibrations and noises of the rolling bearing A can be stabilized for a long period of time at a low value.

The acoustic characteristics of the rolling bearing A as practically determined are explained using FIG. 2. Although not shown in the figure, the test was carried out in the state that an axis is support in the inside wall of an outer cylinder via a pair of two sample bearings. As the above-described bearings, the roller bearings described above as the preferred practical example were used and as a comparative example, rolling bearings wherein the inner and outer rings and the rolling elements were formed with a ball bearing steel which was subjected to a hardening treatment and a tempering treatment were used.

The sample bearing is call no. 695 of JIS Standard, the pressurization is 1.5 kgf, and the outer ring rotation is 72 rpm. The lubricating state is an oil dropped lubrication (1 mg, viscosity 14 cst at 40° C.).

The acoustic value is almost the same at the initial value in the preferred example of the present invention and the comparative example but in the case of the comparative example, the acoustic value rapidly increased after 800 hours and in the case of the preferred example of the present invention, the test was stopped after 1400 hours but the value is almost the same as the initial value. As described above, in the preferred example of the present invention, the acoustic characteristics such as vibrations and noises can be stabilized for a long period of time at a low value.

The rolling bearing A according to the preferred example of the present invention described above can be used for supporting a spindle motor of a hard disc device as shown in FIG. 3. In FIG. 3, the numeral 50 shows a spindle motor for HDD and a rotor hub 51 to which a discs 53 are fixed is rotatably supported via a pair of rolling bearings A, A to a motor spindle 52 to which a stator 51 is fixed.

In this case, an excellent calmness can be maintained such that the rotary shaking of the motor spindle 52 can be reduced to as little as possible and the occurrence of the vibrations and the noises of the rolling bearings A, A can be restrained. Thus, the rolling bearing of the present invention can largely contribute to the prevention of the occurrences of the writing errors of information to the disc 53 and the reading errors of information from the disc 53.

In addition, the rolling bearing of the present invention can be utilized for not only a spindle motor for a HDD but also a video tape recorder and a laser beam printer, the support of the rotary portions by the rolling bearing is stabilized, and thus, the rolling bearings of the present invention can contribute to the improvement of the performance.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A rolling bearing comprising a bearing ring made of a steel material and a plurality of balls made of ceramic material, wherein the amount of austenite remaining in the steel material for forming the bearing ring is set to be in a range of 0.05% to 6%, and the ceramic balls have a precision of at least the requirement of JIS Standard B1501-G3 related to steel balls.

2. The ball bearing of claim 1, wherein the amount of austenite remaining in a portion ranging from an uppermost surface of the steel bearing ring to a depth of approximately 10 μm is set to be in a range of 0.05% to 6%, and wherein a surface hardness of the steel bearing ring is set to be 60 to 64 units of Rockwell hardness HRC (corresponding to 697 to 800 when converted to units of Vickers hardness).

3. The ball bearing as claimed in claim 1, further comprising a retainer for holding the plurality of ceramic balls, wherein the retainer is formed of a synthetic resin material.

4. A rolling bearing comprising a bearing ring made of a steel material and a plurality of balls made of ceramic material, wherein the amount of austenite remaining in the steel material for forming the bearing ring is set to be in a range of 0.05% to 6%, and the ceramic balls have a diameter in the range of 0.8 mm to 2.7781 mm and a precision of at least the requirement of JIS Standard B1501-G3 related to steel balls.

5. The ball bearing of claim 4, wherein the amount of austenite remaining in a portion ranging from an uppermost surface of the steel bearing ring to a depth of approximately 10 μm is set to be in a range of 0.05% to 6%, and wherein a surface hardness of the steel bearing ring is set to be 60 to 64 units of Rockwell hardness HRC (corresponding to 697 to 800 when converted to units of Vickers hardness).

6. The ball bearing as claimed in claim 4, further comprising a retainer for holding the plurality of ceramic balls, wherein the retainer is formed of a synthetic resin material.

7. The ball bearing of claim 4, wherein the diameter of the ceramic balls is approximately 0.8 mm.

8. The ball bearing of claim 7, wherein the amount of austenite remaining in a portion ranging from an uppermost surface of the steel bearing ring to a depth of approximately 10 μm is set to be in a range of 0.05% to 6%, and wherein a surface hardness of the steel bearing ring is set to be 60 to 64 units of Rockwell hardness HRC (corresponding to 697 to 800 when converted to units of Vickers hardness).

9. The ball bearing as claimed in claim 7, further comprising a retainer for holding the plurality of ceramic balls, wherein the retainer is formed of a synthetic resin material.

10. The ball bearing of claim 4, wherein the diameter of the ceramic balls is approximately 1.2 mm.

11. The ball bearing of claim 10, wherein the amount of austenite remaining in a portion ranging from an uppermost surface of the steel bearing ring to a depth of approximately 10 μm is set to be in a range of 0.05% to 6%, and wherein a surface hardness of the steel bearing ring is set to be 60 to 64 units of Rockwell hardness HRC (corresponding to 697 to 800 when converted to units of Vickers hardness).

12. The ball bearing as claimed in claim 10, further comprising a retainer for holding the plurality of ceramic balls, wherein the retainer is formed of a synthetic resin material.

13. The ball bearing of claim 4, wherein the diameter of the ceramic balls is approximately 1.5875 mm.

14. The ball bearing of claim 13, wherein the amount of austenite remaining in a portion ranging from an uppermost surface of the steel bearing ring to a depth of approximately 10 μm is set to be in a range of 0.05% to 6%, and wherein a surface hardness of the steel bearing ring is set to be 60 to 64 units of Rockwell hardness HRC (corresponding to 697 to 800 when converted to units of Vickers hardness).

15. The ball bearing as claimed in claim 13, further comprising a retainer for holding the plurality of ceramic balls, wherein the retainer is formed of a synthetic resin material.

16. The ball bearing of claim 4, wherein the diameter of the ceramic balls is approximately 2.7781 mm.

17. The ball bearing of claim 16, wherein the amount of austenite remaining in a portion ranging from an uppermost surface of the steel bearing ring to a depth of approximately 10 μm is set to be in a range of 0.05% to 6%, and wherein a surface hardness of the steel bearing ring is set to be 60 to 64 units of Rockwell hardness HRC (corresponding to 697 to 800 when converted to units of Vickers hardness).

18. The ball bearing as claimed in claim 16, further comprising a retainer for holding the plurality of ceramic balls, wherein the retainer is formed of a synthetic resin material.

* * * * *